UNITED STATES PATENT OFFICE.

CHRISTOPHER RIS, OF BASLE, SWITZERLAND, ASSIGNOR TO JOHN R. GEIGY & CO., OF SAME PLACE.

STILBENE AZO DYE.

SPECIFICATION forming part of Letters Patent No. 636,065, dated October 31, 1899.

Application filed April 11, 1899. Serial No. 712,650. (Specimens.)

*To all whom it may concern:*

Be it known that I, CHRISTOPHER RIS, a citizen of the Swiss Confederation, residing at Basle, Switzerland, have invented certain new and useful Stilbene Azo Colors, of which the following is a specification.

This invention (for which Letters Patent have hitherto been applied for in Germany, G. 13,069, of January 16, 1899, and in France, No. 274,525, of March 7, 1899) refers to azo coloring-matters containing the rest of stilbene by condensation of paranitrotoluenesulfo-acid with certain para compounds containing at least one amido group, such as paraphenylenediamin, paratoluylenediamin, paraamidophenol, paraämidoörthocresol, paraämidosalicylic acid, or paraämidoörthocresotinic acid.

The characteristic feature of the process employed in the production of these coloring-matters consists in the condensation of two molecules of paranitrotoluenesulfo-acid with one molecule of one of the said para compounds with caustic-alkali lye of a certain concentration, such as from ten to fifteen per cent., and at a temperature below 100° centigrade, with avoidance of boiling—as, for instance, at 70° to 90° centigrade. The reaction takes place according to the following equation:

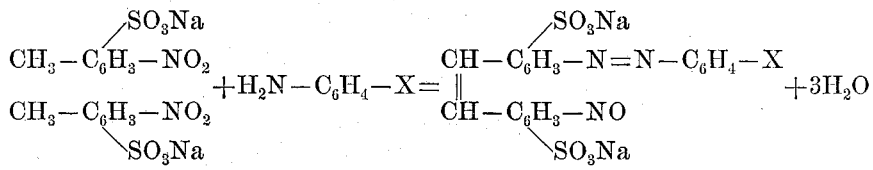

Example I: One hundred kilos of paranitrotoluenesulfo-acid are dissolved in four hundred liters of hot water. Then a solution of twenty-four kilos of paraphenylenediamin in two hundred liters of boiling water is added. At a temperature of 70° centigrade three hundred kilos of caustic-soda lye of 40° Baumé are added and the mass stirred for about three hours, while the temperature is slowly raised to about 98° centigrade. Then the caustic soda is nearly saturated with hydrochloric acid and the coloring-matter salted out, filtered off, pressed, and dried. It dyes unmordanted cotton orange shades.

Example II: If in the foregoing example instead of 24 kilos of paraphenylenediamin the same quantity of paraämidophenol is used and proceeded with in quite the same manner, a coloring-matter is obtained which dyes in gold-yellow shades. This coloring-matter, and also the analogous product derived from paraämidoörthocresol, may be transformed into a derivate fast to the action of alkalies by treating the same by means of alkylation and benzylation with such substances as methylchlorid, ethylchlorid, ethylbromid, or benzylchlorid.

Example III: Thirty kilos of the coloring-matter of Example II are dissolved in one hundred liters of boiling water with ten kilos of caustic-soda lye of 40° Baumé. Then the solution is, with addition of twelve kilos of ethylbromid, heated in an autoclave for about four hours at a temperature of 105° to 110° centigrade. Then the ethylated coloring-matter is filtered off, pressed, and dried. It dyes unmordanted cotton bright gold-yellow shades of great intensity and fastness. Its constitution corresponds to the following formula:

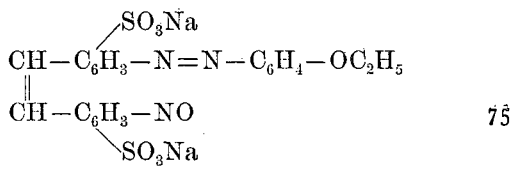

The following are the characteristics of the new coloring-matters: They are easily soluble in water with a yellow to orange color, difficultly soluble in alcohol, insoluble in ether and benzene, and soluble in concentrated sulfuric acid, with a red to violet-red color. Mineral acids produce in the aqueous solution brownish-black to bluish-black precipitates. By means of reduction they are split into diamidostilbenedisulfo-acid and the para compound used for the condensation—for instance, with regard to the color of Example I, into diamidostilbenedisulfo-acid and paraphenylenediamin, and in the case of Example III into the same acid and the ethylether of paraämidophenol.

Having thus described my invention, I claim as new and desire to secure by Letters Patent—

1. The new coloring-matters derived from stilbene by reaction of two molecules of paranitrotoluenesulfo-acid and one molecule of a para compound containing at least one amido group, with caustic-alkali lye, being brown powders, easily soluble in water with yellow to orange color, difficultly soluble in alcohol, insoluble in ether and benzene, precipitated by mineral acids in brownish-black to bluish-black flocks, soluble in concentrated sulfuric acid with red to violet color, dyeing unmordanted cotton in gold-yellow to orange shades, and which are split by means of reduction into diamidostilbenedisulfo-acid and the para compound employed, substantially as set forth.

2. As a new article of manufacture, the specified gold-yellow coloring-matter, which has the following formula:

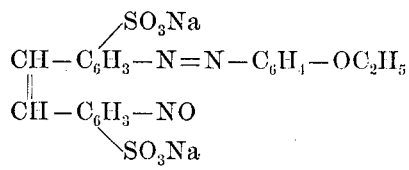

and which has the following properties: being a yellowish-brown powder, soluble in water with gold-yellow color, precipitated by mineral acids in brownish-black flocks, difficultly soluble in alcohol, insoluble in ether and benzene, soluble in concentrated sulfuric acid with violet-red color, and which is split by means of reduction into diamidostilbenedisulfo-acid and the ethylether of paraämidophenol, and dyeing unmordanted cotton fast gold-yellow shades, substantially as set forth.

In testimony that I claim the foregoing as my invention I have signed my name in presence of two subscribing witnesses.

CHRISTOPHER RIS.

Witnesses:
GEORGE GIFFORD,
JOH. G. PLATNER.